2 Sheets—Sheet 1.

J. OPPENHEIMER.

Assignor to THE SQUARE HOLE AUGER COMPANY.

MORTISING MACHINE.

No. 10,655. Reissued Oct. 27, 1885.

WITNESSES
Wm. M. Monroe
Geo. W. King

INVENTOR
James Oppenheimer
by Leggett & Leggett.
Attorneys

N. PETERS, Photo-Lithographer, Washington, D. C.

2 Sheets—Sheet 2.

J. OPPENHEIMER.

Assignor to THE SQUARE HOLE AUGER COMPANY.

MORTISING MACHINE.

No. 10,655. Reissued Oct. 27, 1885.

WITNESSES

Wm. H. Monroe.

Geo. W. King

INVENTOR

James Oppenheimer by Leggett & Leggett.

Attorneys

N. PETERS, Photo-Lithographer, Washington, D. C.

UNITED STATES PATENT OFFICE.

JAMES OPPENHEIMER, OF SHENANDOAH, IOWA, ASSIGNOR TO THE SQUARE HOLE AUGER COMPANY, OF WOOSTER, OHIO.

MORTISING-MACHINE.

SPECIFICATION forming part of Reissued Letters Patent No. 10,655, dated October 27, 1885.

Original No. 307,065, dated October 21, 1884. Application for reissue filed September 22, 1885. Serial No. 177,850.

*To all whom it may concern:*

Be it known that I, JAMES OPPENHEIMER, a citizen of the United States, residing at Shenandoah, in the county of Page and State of Iowa, have invented new and useful Improvements in Mortising-Machines, of which the following is a specification.

My invention relates to mortising-machines; and it consists, primarily, in combining with a crank rotary power such as used in the carpenter's rotary boring-machine a mortising device instead of the boring-bit operated by an oscillating movement, whereby the rotary movement is caused to give an oscillating movement to a mortising-tool for cutting mortises.

The object of my improvement is to convert the carpenter's portable boring-machine into a mortising-machine. For this purpose I provide a mortising appliance for such machine, consisting of an oscillating cutter-head carried by a vertically-operating stock, and operate said cutter-head by a revolving shaft carried by said stock, having a driving-head adapted to operate the oscillating cutter-head by a suitable cam-action. The mortising appliance is connected to the gearing-head in such manner as to be interchangeable with the ordinary boring-bit, so that the machine can be used for boring as well as for mortising. These objects I accomplish by the construction hereinafter described, and shown in the accompanying drawings, in which—

Figure 1:
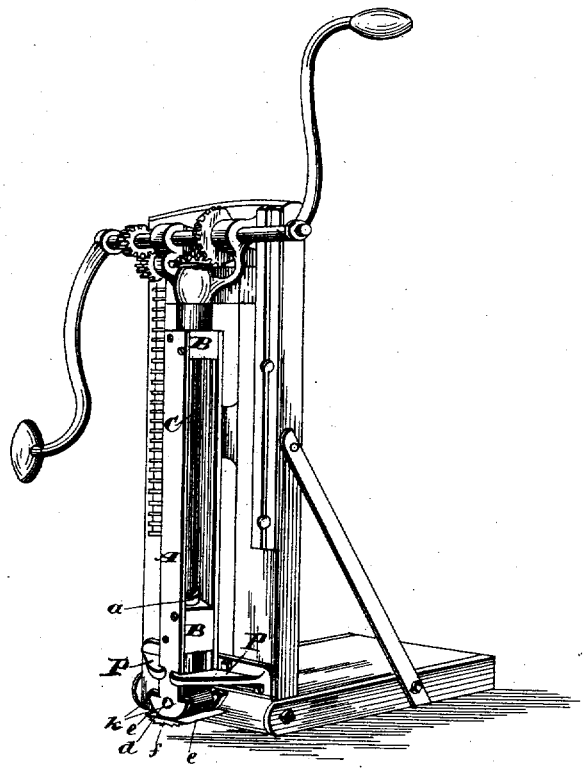
Figures 2, 3, 7:
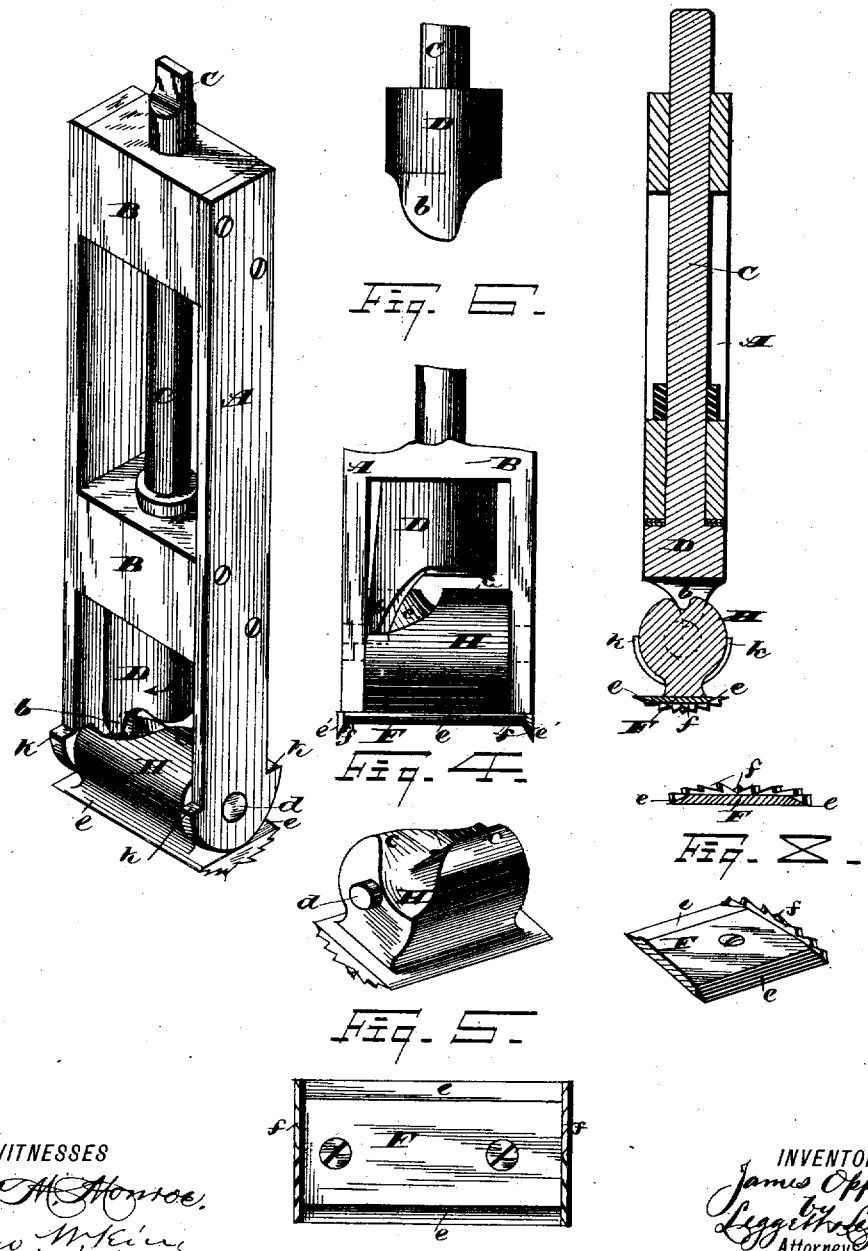

Figure 1 represents a view in perspective of a carpenter's boring-machine with my improved mortising appliance; Fig. 2, a view in perspective of the sliding stock, its oscillating mortising cutter-head, and its revolving operating-shaft; Fig. 3, a vertical section taken transversely through the oscillating cutter head and stock; Fig. 4, a detail in perspective of the oscillating mortising cutter-head; Fig. 5, an enlarged bottom view of the mortising-cutter; Fig. 6, a side view of the oscillating mortising cutter-head, showing its relation to the revolving driving-head; Fig. 7, a view of the driving-head. Fig. 8 represents detail views of the cutter to show the beveled end cutters.

The stock consists of a suitable frame, A, having boxings B B for a revolving shaft, C, operated by hand-power, as in the common boring-machine, as before mentioned. This shaft C is held in position by a suitable collar, *a*, fastened by set-screw resting upon the lower boxing of the frame, and it extends above the top boxing for connection with the operating-power in the manner of the boring-bit. Secured upon the end of said shaft, below the lower boxing B, or cast with it, is a driving-head, D, having on its lower end at one side a downward cam-operating projection, *b*, for engaging with the walls *c c* of a cam-groove running spirally across the top portion of the cutter-head H. The revolutions of the shaft C, with its projection *b* engaging the walls *c c*, cause the cutter-head to oscillate, and its cutter F to clip the shavings alternately across the grain, and by thus operating a square hole is formed. The said cutter-head has a journal, *d*, on each end, which works in bearings in the frame A near its lower end. The cutter-head is flat on the lower side, while on the opposite or upper side it has the hollows or steps *c c*, as before mentioned, which form a kind of rocking cam, which engages with the downward projection *b* on the driving-head when in operation. The said cam-operating projection *b* on the driving-head and the hollows or steps of the rock-cam are cast on a chill, or are of the proper metal to be case-hardened. This is of importance in order to prevent them from wearing, as there is great power required of them when in operation. The cutter proper, F, has two cutting-edges, *e e*, and is attached to the bottom or flat side of the cutter-head by screws or otherwise. In connection with the said cutter, while it has two shaving cutting-edges, *e e*, it has formed on each end a segmental cutter, *f f*, projecting downwardly therefrom, for the purpose of cutting the end walls of the mortise by making cross rips or furrows across the grain of the wood in advance of the cutting-edges *e e*, so that the latter may do their work easier, and not splinter the surface of the wood in starting by reason of furrows having been first cut; but the important part of the segmental end cutters is in the shape of their teeth. It will be observed that these cutter-teeth are beveled all on the inside of the segmental projection *f*, so as to form connected cutting-edges, to make a clean cross-cut back and forth, or with each oscillation of the cutter-head. They do not stand as in a common handsaw, but are more on the plan of the teeth in a mowing-machine sickle, but not so much in the hook form as that of the sickle-tooth, but more of a knife-edge. From the center of the segmental cutter *f* each section of cutter-teeth stand with their cutting-edges from each other in the direction of the knife-edges *e e*, so that they stand in the right form for back-and-forth cuts. The cutter-teeth are filed very slanting, almost or quite as much so as sickle-teeth, thus affording no chance for the sawdust to clog between them.

It will be seen in the accompanying drawings that I have provided hook-like projections *k k* in a shelf form near the lower end of the frame A, on each side thereof, which are for ejecting the shavings or cuttings from the hole. The said shelf projections are at the proper point—near the lower end of the frame, above the knife-edges *e e*—to receive and hold the cuttings as they are cut and forced up. As the shavings accumulate and bind in the mortise or hole, then by raising the stock or frame the shavings are readily ejected from the mortise by the shelf projections *k k*. Furthermore, it will be seen by referring to Fig. 1 that suitable guides, P, are provided for holding the lower end of the stock A in position when the machine is in operation, the upper end of said stock being held in position by its connection with the gearing-head.

The cutter F can be removed and renewed when required. By wear and sharpening it becomes less in width, and to compensate for this the cutter can be removed and a metal-plate bushing placed between it and its seat, thus preserving the same extent of cut. The relation of the stock A to the cutter is such as to allow the stock to pass into the mortise free of its walls, so that it will not bind, and for this purpose the end cutters, *f f*, must extend beyond the sides of the stock, as shown in Fig. 6. The mortising-tool is raised from the mortise as the carpenter's hand boring-machine, and in its vertical movement it is guided by the guides, which are bolted to and project from the vertical framing of the machine and embrace the stock, while the upper end of the driving-shaft is secured in a socket in the lower end of the short shaft of the bevel driving-gear in the same manner as in the common carpenter's hand-borer. My mortising appliance may, however, be used in stationary power-machines.

What I claim is—

1. In a mortising-machine, an oscillating cutter-head having a cam-groove running spirally across one portion of the head, and a shaft with a lug or toe connected and eccentric with the shaft acting as a cam and operating in the cam-groove of the cutter-head, and so arranged that by rotating the shaft an oscillating movement is given to the cutter-head, substantially as set forth.

2. In a mortising-machine, in combination with a sliding stock, a cutter-head and shaft journaled therein, a cam-groove running spirally across the periphery on one side of the cutter-head, and a lug or toe connected and eccentric with the shaft for operating in the cam-groove of the cutter-head, by means of which an oscillating movement is given to the cutter-head by rotating the shaft, substantially as set forth.

3. In a mortising-machine, a sliding stock with a cutter-head and shaft journaled therein, a cam-groove on the periphery of the cutter-head, and an engaging lug or cam connected with the shaft for oscillating the cutter, and the parts arranged substantially as indicated, so that the mortising device may be attached to and operated by an ordinary boring-machine.

4. The cutter-head having a flat base, a cam formation at the side opposite to the base, and end journals, combined with a flat cutting-blade having side and end cross segmental cutters, a vertically-operating slide-stock, and a vertically-revolving shaft fitted in bearings in said slide-stock, having the lower end terminating in a nose-cam projection adapted to act upon the cam formation of the cutter-head, substantially as described, for the purpose specified.

5. The combination, with the slide-stock A and the cam cutter-head journaled therein, of a cutter-blade having side cutting-edges, *e e*, and projecting end segmental cutters, *f f*, secured to the said cutter-head, and the vertical revolving shaft C, having a free engaging cam projection with said cutter-head, the said end cross-cutters extending outside of the vertical plane of the said slide-stock, substantially as herein described, for the purpose specified.

6. The slide-stock A, having its lower end rounded at each side and formed with the side clearing shelves or projections, combined with the cam cutter-head, the cutter F, and the revolving cam-shaft, the cam whereof has a free engagement with the cutter-head cam, for operation substantially as shown and described.

7. The cutter-head having the cam hollows or steps *c c*, and the cutter F, having the side and end cutters formed substantially as described, in combination with a driving-shaft having a cam projection adapted to engage with said cutter-head, cam-steps, and a stock in which the cutter-head and its operating-shaft are mounted in the relation to each other as described.

8. An oscillating mortising cutter-head having journal-bearings, combined with a cutter having parallel side cutting-edges, *e e*, and segmental end projections having cutter-teeth *f*, beveled from their inner sides in opposite directions from the middle of said cutter, substantially as herein set forth, for the purpose specified.

9. The combination, with an oscillating cutter-head and a shaft adapted to operate said cutter-head by a revolving motion, of a vertically-operating stock having side clearing shelves or projections arranged above the oscillating cutter, substantially as described, for the purpose specified.

10. The combination, with the slide-stock, of an oscillatory cutter-head and a cutter proper having opposite edge cutters and end cutters, the latter being toothed to cut across the grain in the direction of its operation both ways, substantially as described.

11. An oscillating mortising cutter-head having journal-bearings, combined with a cutter having parallel side cutting edges and parallel end cutters, substantially as described.

In testimony whereof I sign this specification, in the presence of two witnesses, this the 1st day of June, A. D. 1885.

JAMES OPPENHEIMER.

Witnesses:
Z. D. MATHEWS,
J. UHL.